(12) United States Patent
Cheng

(10) Patent No.: US 7,669,345 B2
(45) Date of Patent: Mar. 2, 2010

(54) HEIGHT-ADJUSTING DEVICE

(75) Inventor: Yi-Qun Cheng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 96 days.

(21) Appl. No.: 11/967,023

(22) Filed: Dec. 29, 2007

(65) Prior Publication Data

US 2009/0067945 A1     Mar. 12, 2009

(30) Foreign Application Priority Data

Sep. 7, 2007   (CN) .................... 2007 1 0077016

(51) Int. Cl.
*B23Q 16/00*   (2006.01)
(52) U.S. Cl. .................. 33/568; 33/536; 269/69
(58) Field of Classification Search .................. 33/501, 33/502, 534–538, 567, 567.1, 568–570, 573, 33/626, 613, 645, 809–812; 269/76, 53, 269/48.2, 69; 409/224, 227, 903
See application file for complete search history.

(56) References Cited

U.S. PATENT DOCUMENTS

| | | | | | |
|---|---|---|---|---|---|
| 423,888 | A | * | 3/1890 | Goldsmith | .................. 285/42 |
| 1,488,482 | A | * | 4/1924 | Eckman | ........................ 33/418 |
| 1,826,802 | A | * | 10/1931 | Lovenston | .................... 33/419 |
| 2,542,938 | A | * | 2/1951 | Morris | ........................ 33/340 |
| 3,820,247 | A | * | 6/1974 | Casey et al. | .................... 33/537 |
| 4,342,153 | A | * | 8/1982 | Cole | ............................ 33/836 |
| 4,986,323 | A | * | 1/1991 | Lemaire, Jr. | ............. 144/253.1 |
| 5,179,787 | A | * | 1/1993 | Ostrowski | ..................... 33/613 |
| 5,329,703 | A | * | 7/1994 | Craig | ............................ 33/567 |
| 6,263,585 | B1 | * | 7/2001 | Dickinson et al. | ............. 33/836 |
| 6,494,445 | B1 | * | 12/2002 | Bellis, Jr. | ....................... 269/71 |
| 7,063,311 | B1 | * | 6/2006 | Ascolese | ....................... 269/69 |
| 7,171,760 | B1 | * | 2/2007 | Lemon | ......................... 33/833 |

* cited by examiner

*Primary Examiner*—Amy Cohen Johnson
(74) *Attorney, Agent, or Firm*—Steven M. Reiss

(57) ABSTRACT

An exemplary height-adjusting device (10) includes a base (12), a sliding block (14) and at least one fixing member (18). The base has a sliding slot (122) defined therein and a first sidewall (123), a second sidewall (124), a third sidewall (125), and a fourth sidewall (126) surrounding the sliding slot. At least one fixing hole (1232) defined in the first sidewall. The at least one fixing hole communicates with the sliding slot. The sliding block is slidably received in the sliding slot and partly protruding outwardly from the sliding slot. At least one fixing member cooperates with the at least one fixing hole to selectively fix the sliding block in the base.

6 Claims, 4 Drawing Sheets

HEIGHT-ADJUSTING DEVICE

BACKGROUND OF THE INVENTION

1. Field of the Invention

The present invention relates to height-adjusting devices and, particularly to a height-adjusting device applied for adjusting a height of a component (e.g., a molded mechanicals) machining apparatus.

2. Description of Related Art

In machining process of molded articles, due to a rapid update of molds, auxiliary devices such as sine tables and sine bars are often needed to be used for machining slopes of molded articles in various processes, such as grinding process, linearly cutting process, electro-discharge machining process, and so on.

Referring to FIG. 4, in typical, an auxiliary device is a sine table 30. The sine table 30 includes a baseboard 32, a machining board 34 and a rotating axis 36. The baseboard 32 and the machining board 34 are rotatably connected by the rotating axis 36. The baseboard 32 includes an upper surface 322 with a placement area 324 provided therein. The machining board 34 includes a first surface 342 and a second surface 344. The first surface 342 is opposed to the second surface 344. The first surface 342 is an operating surface provided for depositing a machined article. A pressure lever 346 is formed on a distal end of the second surface 344 and paralleled to the rotating axis 36. The pressure lever 346 is provided for pressing the top of a typical height-adjusting device 40.

In use, the height-adjusting device 40 blocks up the pressure lever 346 in a distal end of the machining board 34, so that an angle between the baseboard 32 and the machining board 34 is formed. The angle is determined in accordance with a gradient of the slope needed be machined in a molded article. A needed height of the height-adjusting device 40 is calculated by calculating a sine value of the angle.

The typical height-adjusting device 40 is formed by stacking a plurality of precision set blocks. To meet different requirements of height, each precision set block is repeatedly used for constituting different combinations. However, because of being repeatedly used, the precision set blocks are prone to be abrased. Additionally, the precision set blocks are quite expensive, which increase the overall production cost. Furthermore, different heights require different combinations of set blocks. Every combination of set blocks requires a relatively complex and time-consuming combination process, which reduce the efficiency of production. Moreover, the combination of precision set blocks cannot achieve a precise height, thus may affect the precision of the product.

Therefore, a new height-adjusting device applied in a component (e.g., a molded mechanicals) machining apparatus is desired in order to overcome the above-described problems.

SUMMARY

In one aspect thereof, a height-adjusting device includes a base, a sliding block and at least one fixing member. The base has a sliding slot defined therein and a first sidewall, a second sidewall, a third sidewall, and a fourth sidewall surrounding the sliding slot. At least one fixing hole is defined in the first sidewall. The at least one fixing hole communicates with the sliding slot. The sliding block is slidably received in the sliding slot and partly protruding outwardly from the sliding slot. At least one fixing member cooperates with the at least one fixing hole to selectively fix the sliding block in the base.

In another aspect thereof, a height-adjusting device includes a base, a sliding block and a positioning member. The base has a sliding slot defined therein and a first sidewall, a second sidewall, a third sidewall, and a fourth sidewall surrounding the sliding slot. At least one positioning hole is defined through the third sidewall and the fourth sidewall. The at least one positioning hole communicates with the sliding slot. The sliding block is slidably received in the sliding slot and partly protrudes outwardly from the sliding slot. A plurality of latching holes is defined in a sidewall of the sliding block. A positioning member cooperates with the at least one positioning hole and a corresponding latching hole to position the sliding block in the sliding slot.

Other advantages and novel features will become more apparent from the following detailed description when taken in conjunction with the accompanying drawings.

BRIEF DESCRIPTION OF THE DRAWINGS

Many aspects of the height-adjusting device can be better understood with reference to the following drawings. The components in the drawings are not necessarily drawn to scale, the emphasis instead being placed upon clearly illustrating the principles of the present height-adjusting device. Moreover, in the drawings, like reference numerals designate corresponding parts throughout the several views, wherein.

DETAILED DESCRIPTION OF THE INVENTION

Figure 1:
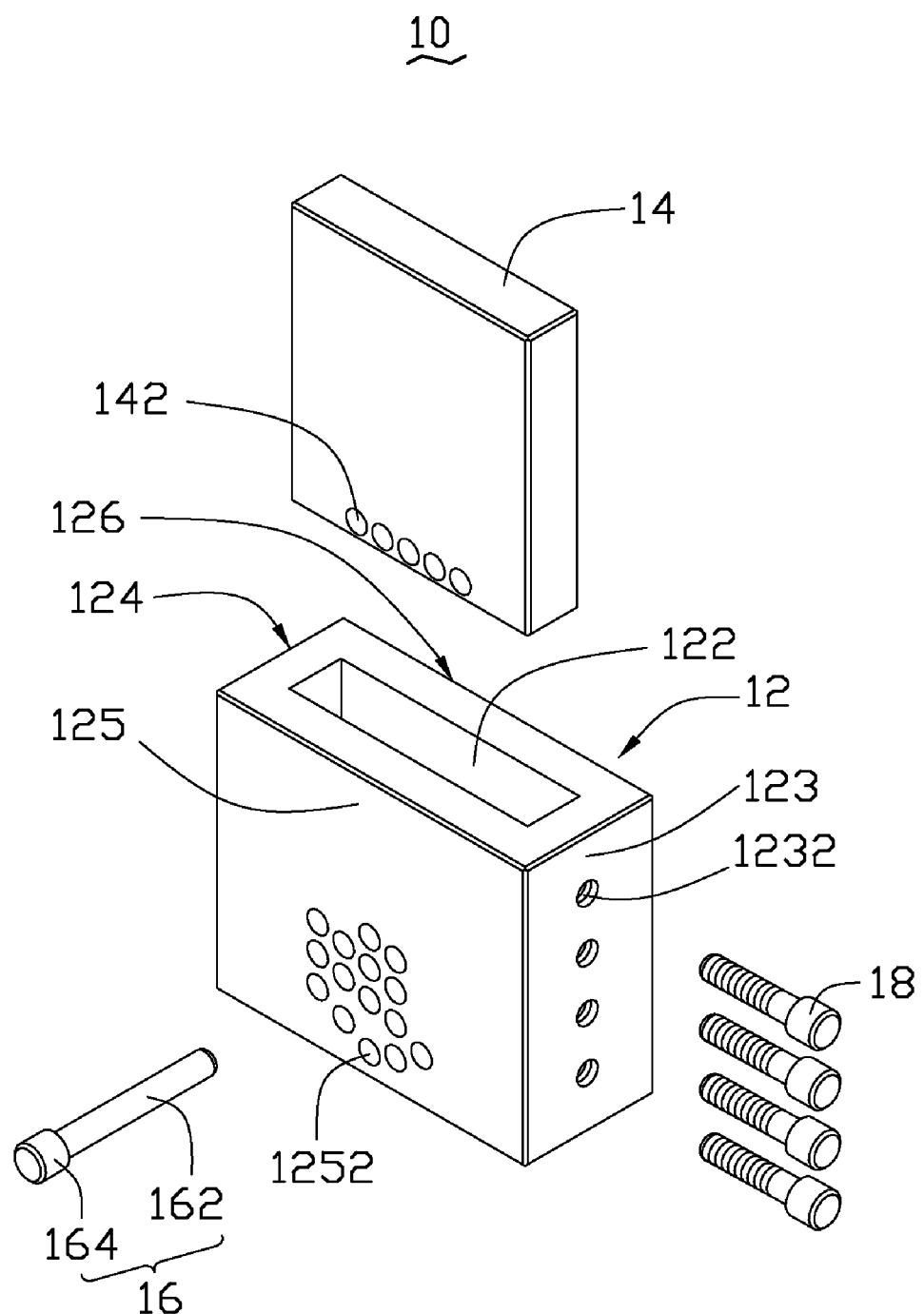
FIG. 1 is an disassembled, isometric view of a height-adjusting device, in accordance with a present embodiment.

Referring to FIG. 1, a height-adjusting device 10 according to a present embodiment includes a base 12, a sliding block 14, a positioning member 16 and a fixing member 18.

The base 12 is structured and shaped as hollow rectangular parallelepiped. A sliding slot 122 is defined through the base 12. The sliding slot 122 is a rectangular slot surrounded by a first sidewall 123, a second sidewall 124, a third sidewall 125 and a fourth sidewall 126 of the base 12. The second sidewall 124 is opposed to the first sidewall 123. The fourth sidewall 126 is opposed to the third sidewall 125. At least one fixing hole 1232 is defined through the first sidewall 123 and communicates with the sliding slot 122. The at least one fixing hole 1232 is a thread hole. A plurality of positioning holes 1252 is defined through the third sidewall 125 and the fourth sidewall 126, and communicates with the sliding slot 122.

The sliding block 14 is a rectangular block. The size and shape of the sliding block 14 correspond with the sliding slot 122. The sliding block 14 is provided for being slidably received in the sliding slot 122. When received in the sliding slot 122, a part of the sliding block 14 protrudes outwardly from the sliding slot 122. The sliding block 14 has a plurality of latching holes 142 defined and disposed adjacent to an end thereof. The latching holes 142 are through holes. A diameter of each lathing hole 142 is equal to a diameter of each positioning hole 1252.

In this embodiment, the positioning member 16 is a positioning pin configured for fixing the sliding block 12 in different height relative to the base 12. The positioning member 16 includes a main body 162 and an operating portion 164.

The operating portion 164 protrudes from a distal end of the main body 162. A diameter of the operating portion 164 is larger than that of the main body 162. The main body 162 is shaped as a cylinder. A diameter of the main body 162 is approximately equal to the diameter of each latching hole 142 and each positioning hole 1252. The main body 162 of the positioning member 16 is provided for being received in a positioning hole 1252 and a corresponding latching hole 142 to locate the sliding block 14 in different height relate to the base 12. The fixing member 18 is a bolt. The fixing member 18 is provided for cooperating with each of the at least fixing hole 1232 and resisting the sliding block 12 received in the sliding slot 142 in different height.

In assembling the height-adjusting device 10, the sliding block 14 is received in the sliding slot 122, with one of the latching holes 142 aligning with one of the positioning holes 1252. Then, the main body 162 of positioning member 16 is inserted the latching hole 142 and the positioning hole 1252, with the operating portion 164 resisting the third sidewall of the base 12. The fixing member 18 resists the sliding block 12 through a fixing hole 1232 to make the sliding block 14 preferably positioned in the sliding slot 142, with one end of the sliding block 14 exposing out of the sliding slot 142. A position of the sliding block 14 in the sliding slot 122 of the base 12 may be adjusted by making the positioning member 16 engaging in one latching hole 142 and a different positioning hole 1252. That is, a distance between the end of the sliding block 14 exposing out of the sliding slot 122 and the base 12 can be adjusted. It should be understood that the fixing member 18 and the fixing hole 1232 could be omitted.

Figure 2:
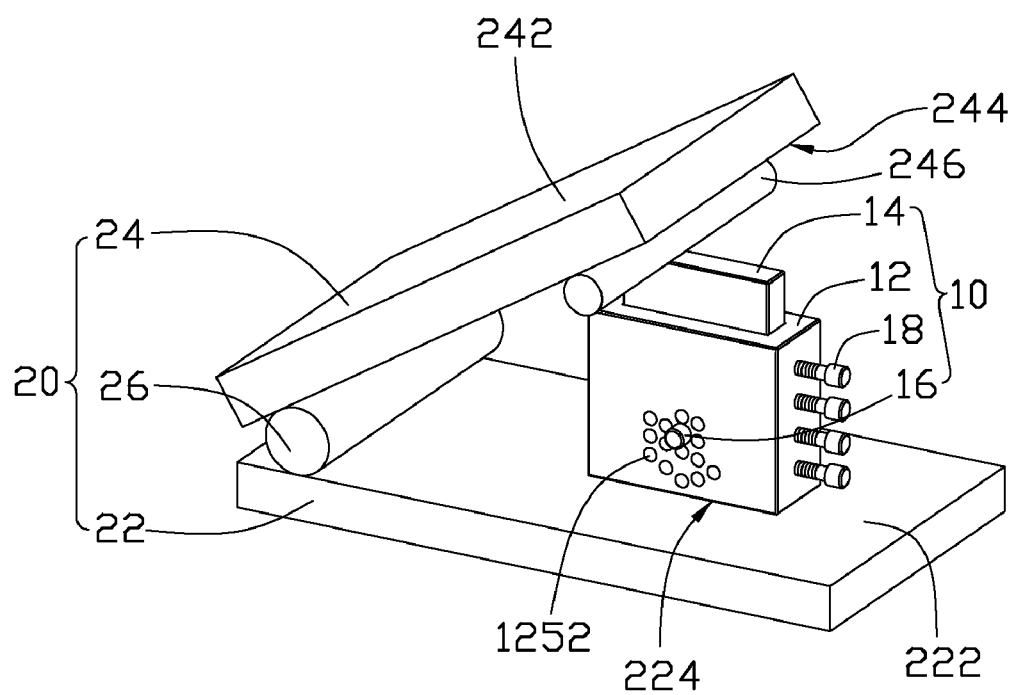
FIG. 2 is an assembled, explanatory view explaining operation of the height-adjusting device in a sine table at fixed angles.
Figure 3:
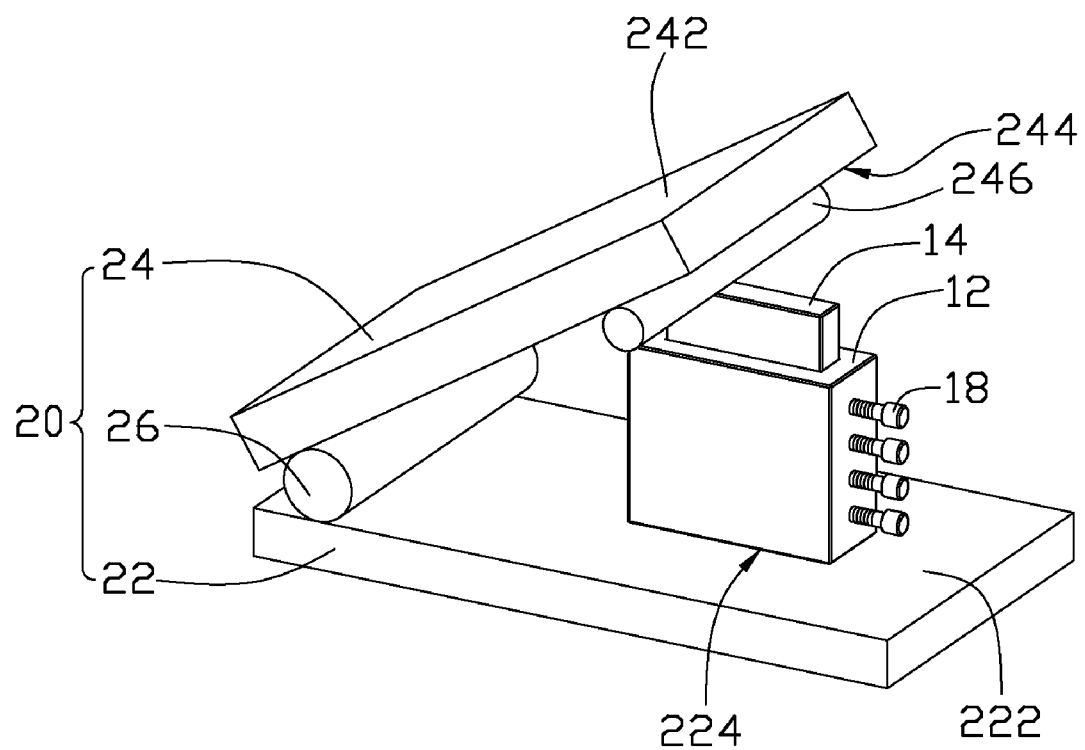
FIG. 3 is an assembled, explanatory view explaining operation of the height-adjusting device in a sine table at random angles.
Figure 4:
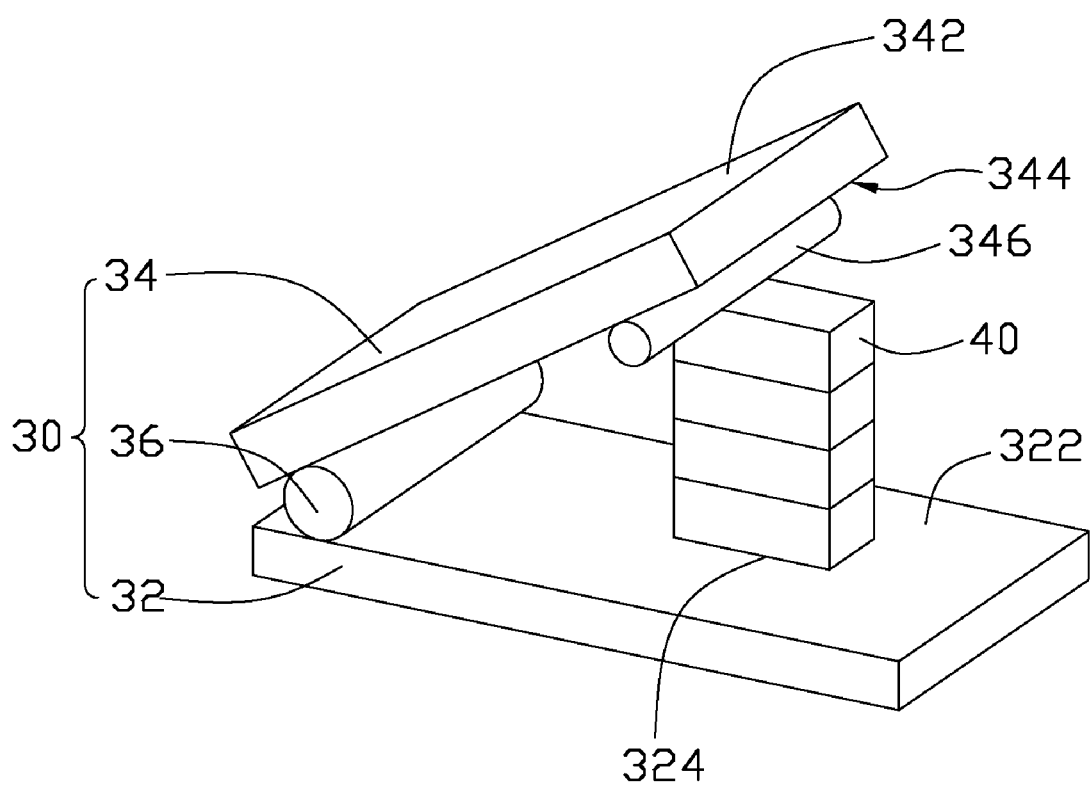
FIG. 4 is an assembled, explanatory view of a typical height-adjusting device applied in a sine table, in accordance with a related art of the present invention.

Further referring to FIG. 2 and FIG. 3, in machining process of molded articles, the height-adjusting device 10 is applied in a sine table 20. The sine table 20 includes a baseboard 22, a machining board 24 and a rotating axis 26. The baseboard 22 and the machining board 24 are rotatably connected by the rotating axis 26. The baseboard 22 includes an upper surface 222 with a placement area 224 provided therein. The machining board 24 includes a first surface 242 and a second surface 244. The first surface 242 is an operating surface provided for depositing machined article. A pressure lever 246 is disposed on one end of the second surface 244 and paralleled to the rotating axis 26. The pressure lever 246 is configured for providing a uniform pressure force to the top of the height-adjusting device 10, so that the height-adjusting device 10 can be kept well-balanced.

In use, the height-adjusting device 10 supports the pressure lever 246 in one end of the machining board 24, so that an angle between the baseboard 22 and the machining board 24 is formed. A desired angle between the baseboard 22 and the machining board 24 is determined in accordance with a gradient of the slope to be machined. A desired height of the height-adjusting device 10 relative to the baseboard 22 is calculated by calculating a sine value of the desired angle between the baseboard 22 and the machining board 24. The desired height of the height-adjusting device 10 relative to the baseboard 22 is achieved by adjusting a position of the sliding block 14 in the sliding slot 122 of the base 12. When the positioning member 16 engages in the latching hole 142 and a specific positioning hole 1252, the position of the sliding block 14 in the sliding slot 122 of the base 12 is determined. Thus, the desired angle is determined. That is, the desired angle between the baseboard 22 and the machining board 24 is determined by making the positioning member 16 engaging in the latching hole 142 and a specific positioning hole 1252. Each of the positioning holes 1252 corresponds to a fixed angle of the included angle between the baseboard 22 and the machining board 24. That is, each of the positioning holes 1252 corresponds to a specific height between the baseboard 22 and the machining board 24 of the height-adjusting device 10. In this present embodiment, an exemplary range of the angle between the baseboard 22 and the machining board 24 is 0 degree to 45 degrees.

For example, referring to FIG. 2, the height-adjusting device 10 is used for adjusting the sine table at fixed angles. An exemplary angle between the baseboard 22 and the machining board 24 is 37 degrees shown in FIG. 2. When the positioning member 16 engages in the latching hole 142 and a specific positioning hole 1252 corresponds to 37 degrees, the position of the sliding block 14 in the sliding slot 122 of the base 12 is determined. Thus, the desired angle is determined.

Further referring to FIG. 3, in another embodiment, the height-adjusting device 10 is used for adjusting the sine table at random angles in the range of the angle between the baseboard 22 and the machining board 24. An exemplary angle is 37.5 degrees shown in FIG. 3. The required height of the height-adjusting device 10 is calculated by calculating a sine value of 37.5 degrees. The sliding block 14 is slid to a position in the sliding slot 122 corresponding to the required height of the height-adjusting device 10. The fixing member 18 resists the sliding block 12 through a fixing hole 1232 to selectively fix the sliding block 12 in the sliding slot 142. Obviously, the positioning holes 1252 defined in the base and the positioning member 16 is omitted.

A main advantage of present height-adjusting device 10 is that the sliding structure can be repeatedly used for adjusting different heights, thus the cost of product is effectively saved. Additionally, the adjusting process of the height-adjusting device 10 is quite simple and timesaving, which improves production efficiency. Furthermore, an adjusting precision can be ensured due to the present height-adjusting device 10 can be used for both fixed value adjusting and random value adjusting.

It should be understood that, the sliding slot 122 can also be defined in the base 12 with a bottom wall (not shown). The bottom wall forms a close end of the base 12. In additional, the cooperation of the rectangular sliding block 14 and the rectangular sliding slot 122 can be a cooperation of a dovetail block and a dovetail slot, or a cooperation of a V-shaped block and a V-shaped slot. Furthermore, a through slot (not shown) is further defined in a sidewall of the base 12, and an operating handle (not shown) protrudes in a sidewall of the sliding block 14. The operating handle protrudes outwards the base 12 from the through slot. The sliding block 14 can be slid in the sliding slot 122 by driving the operating handle. Moreover, the fixing holes 1232 can be provided corresponding to a fixed height of height-adjusting device 10.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A height-adjusting device comprising:
 a base having a sliding slot defined therein and a first sidewall, a second sidewall, a third sidewall, and a fourth sidewall surrounding the sliding slot, at least one fixing hole defined in the first sidewall, the at least one fixing hole communicating with the sliding slot;

a sliding block slidably received in the sliding slot and partly protruding outwardly from the sliding slot;

at least one fixing member cooperating with the at least one fixing hole to securely abut a sidewall of the sliding block to be selectively fixed in the base; and a positioning member and a plurality of positioning holes defined though the third sidewall and fourth sidewall, a plurality of latching holes defined in a sidewall of the sliding block, a diameter of each latching hole is equal to a diameter of each positioning hole, the positioning member cooperates with each of the positioning holes and a corresponding latching hole to position the sliding block in the sliding slot.

2. The height-adjusting device as claimed in claim 1, wherein the base is structured and shaped as hollow rectangular parallelepiped, the second sidewall is opposed to the first sidewall, and the fourth sidewall is opposed to the third sidewall.

3. A height-adjusting device comprising:

a base having a sliding slot defined therein and a first sidewall, a second sidewall, a third sidewall, and a fourth sidewall surrounding the sliding slot, at least one positioning hole defined through the third sidewall and the fourth sidewall, the at least one positioning hole communicating with the sliding slot, at least one fixing hole defined in the first sidewall, the at least one fixing hole communicating with the sliding slot;

a sliding block slidably received in the sliding slot and partly protruding outwardly from the sliding slot, a plurality of latching holes being defined in a sidewall of the sliding block;

a positioning member cooperating with the at least one positioning hole and a corresponding latching hole to position the sliding block in the sliding slot; and at least one fixing member cooperating with the at least one fixing hole to securely abut a sidewall of the sliding block to be selectively fixed in the base.

4. The height-adjusting device as claimed in claim 3, wherein the base is structured and shaped as hollow rectangular parallelepiped, the second sidewall is opposed to the first sidewall, and the fourth sidewall is opposed to the third sidewall.

5. The height-adjusting device as claimed in claim 3, wherein a diameter of each latching hole is equal to a diameter of each positioning hole.

6. The height-adjusting device as claimed in claim 3, wherein the positioning member includes a positioning pin including a main body shaped as cylinder, a diameter of the main body is approximately equal to the diameter of each latching hole and each positioning hole, the main body of the positioning member is provided for being received in a positioning hole and a corresponding latching hole.

* * * * *